Nov. 6, 1951     H. F. FLOWERS     2,574,323
DOUBLE-WEBBED RAIL WHEEL

Filed Jan. 20, 1947     3 Sheets-Sheet 1

Nov. 6, 1951 H. F. FLOWERS 2,574,323
DOUBLE-WEBBED RAIL WHEEL
Filed Jan. 20, 1947 3 Sheets-Sheet 2

Inventor
Henry Fort Flowers
By
Mason, Porter Diller & Stewart
Attorneys

Patented Nov. 6, 1951

2,574,323

UNITED STATES PATENT OFFICE 2,574,323

DOUBLE-WEBBED RAIL WHEEL

Henry Fort Flowers, Findlay, Ohio

Application January 20, 1947, Serial No. 723,126

3 Claims. (Cl. 295—21)

The present invention relates to railway truck wheels, in particular the small diameter flanged wheels used in mine cars and the like.

According to my invention I provide a wheel assembly comprising a webbed wheel rim pressed on a webbed wheel center to form a double-webbed wheel to be mounted on an axle or stub axle.

An object of the invention is to provide a wheel with two widely spaced supporting webs which transmit the pressure on the tread from the rail directly to widely spaced anti-friction bearings in the wheel hub.

Another object of the invention is to provide a rail wheel assembly in which the rim is held on the wheel center or hub by a frictional press fit at two widely spaced sets of mating cylindrical surfaces.

Another object of the invention is to provide a double-webbed wheel of the above type wherein a web formed integral with the center or hub of the wheel has a press fit with the rim at the side thereof carrying the rail flange whereby end thrust on the hub resisted by the flange contacting with the rail tends to tighten the wedge fit between the web and the rim.

Another object of the invention is to provide a wheel so constructed that new tread and flange wearing surfaces may be provided on a worn wheel without the necessity of remachining the hub of the wheel to install anti-friction bearings.

Another object of the invention is to provide a wheel structure in which the best suitable materials, processes, and heat treatments may be selected for the component parts, using a hard, abrasion resisting steel in the replaceable rim and a free-machining steel in the wheel center.

Another object of the invention is to provide a wheel of two simple component parts, both of which can be economically forged from standard steel billets on high-production forging presses.

These and other objects will in part be obvious and will in part be hereinafter more fully disclosed.

In the drawings:

Figure 4 is a view in section of a double-webbed rail wheel assembly which is a modification of the assembly shown in Figure 1.

Figure 1:
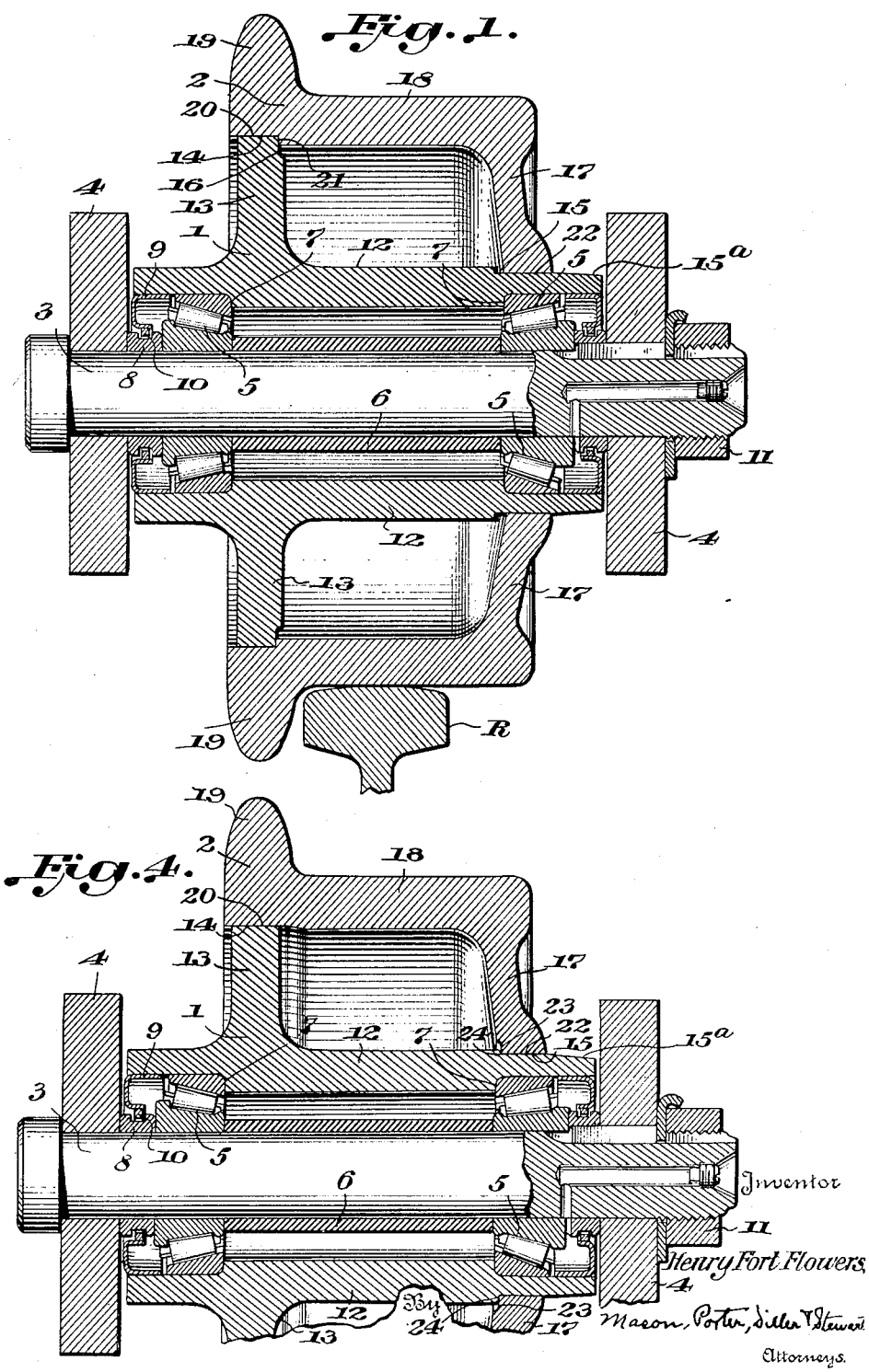
Figure 1 shows a double-webbed rail wheel assembly as mounted in the frame structure of an axleless truck, the view being a cross section taken on a vertical plane through the center line of the wheel.
Figure 2:
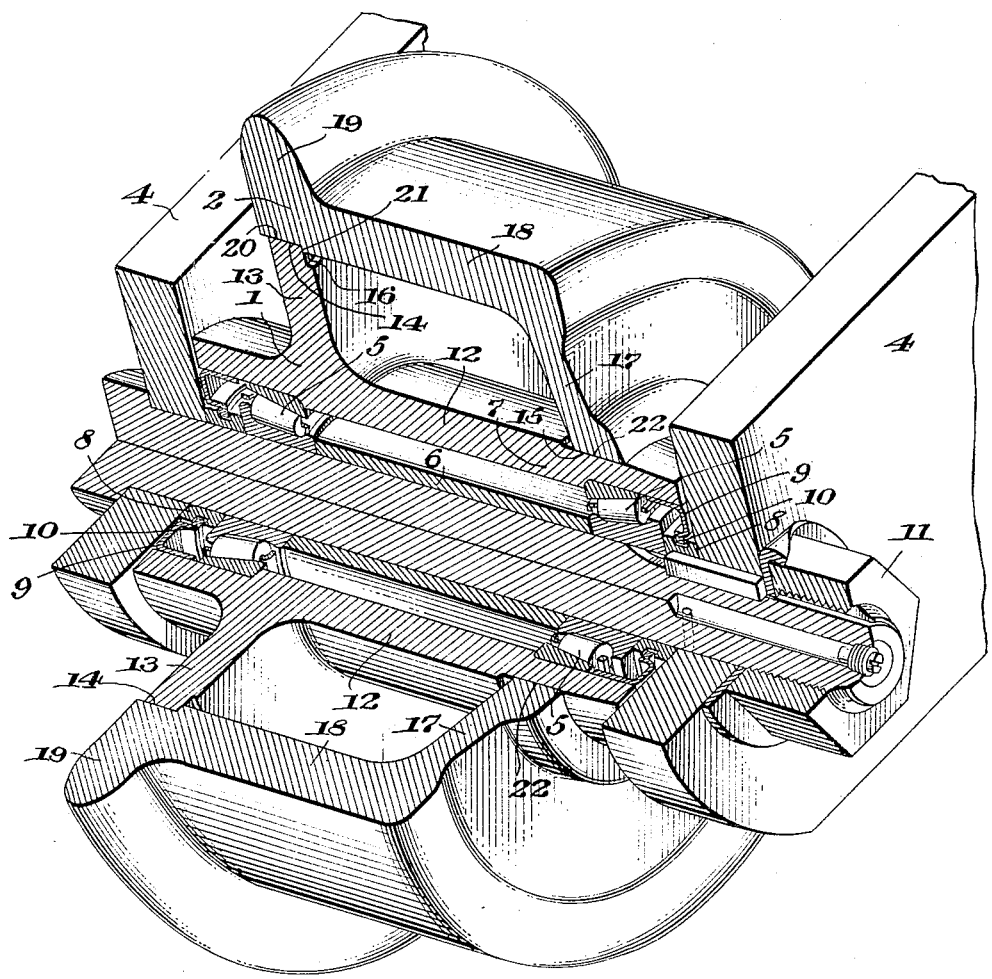
Figure 2 is an isometric view, partially cut away, of the wheel assembly shown in Figure 1.

As shown in Figures 1 and 2, a typical wheel assembly consists of a webbed wheel center 1 on which is fitted a webbed wheel rim 2. The webbed wheel center 1, which is machined on the interior thereof to provide proper seats for anti-friction bearings, is mounted on a spindle 3 which in turn is mounted in the side frames 4, 4 of the truck. Between the webbed wheel center and the spindle 3 are bearings 5, 5 of the usual type. These bearings are held in position by a spacing sleeve 6 and by shoulders 7, 7 formed on the inner surface of the webbed wheel center by machining. Between the bearings and the side frames of the truck are outer spacing sleeves 8, 8, dust seals 9, 9 and snap ring oil seals 10, 10. The entire assembly is clamped in place by threading nut 11 on the end of spindle 3. This specific mounting of the webbed wheel center on the spindle or stub axle of an axleless truck forms no part of the present invention but is shown, described and claimed in my co-pending application Serial No. 707,822, filed November 5, 1946.

The webbed wheel center 1 shown in section in Figure 2 consists of a cylindrical hub 12 with an integral rim supporting web 13 which serves as one of the webs supporting the tread of the wheel. Except for the manufacture of a small number of webbed wheel centers, which are in that case more economical to fabricate by welding a flange to a short length of tubing, the center preferably is press forged from heated bar stock of free-machining steel. Both ends of the hub are bored to furnish the inner bearing shoulders 7, 7 and then the web circumferential surface 14 and hub surface 15 are machined to provide surfaces upon which the webbed wheel rim bears in frictional engagement. In addition an annular surface 16 is machined on the web 13 to provide a square plane surface against which a machined shoulder on the corresponding mating surface of the webbed wheel rim is pressed.

Figure 3:
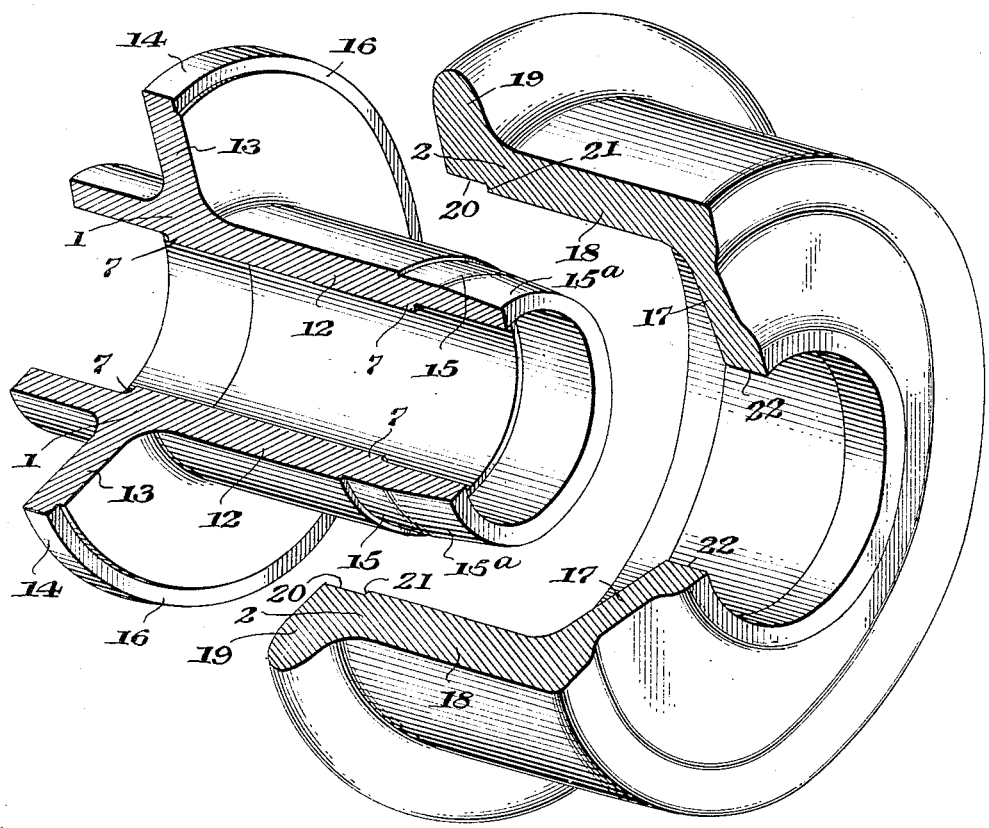
Figure 3 is an isometric view, partially cut away, of a webbed wheel center and a webbed wheel rim showing them in their relative position before being pressed together.

The webbed wheel rim 2, shown in section in Figure 3, consists of a web 17, a tread 18, upon which the wheel rolls, and a flange 19. Like the webbed wheel center 1, the rim 2 can be built up by welding pieces of steel plate and tubing, or it can be cast, but for economical production it is preferably forged from a steel billet. One of the reasons for designing the webbed wheel rim with a flange at one side and the web at the other is that it is simpler to forge that shape from a solid billet than one which has the rim and web on the same side of the rim. Another advantage of the particular design shown is that the flange 19 serves to strengthen the inside edge of the rim, while the web 17 serves to support and strengthen the outside edge of the rim. Forging in this manner gives a homogeneous structure and a very desirable direction of grain flow at the junction of the flange 19 with the tread 18 and at the junction of the rim web 17 with the tread 18. The steel for the webbed wheel rim is chosen primarily for its strength and abrasion resistance, and the rim can be heat treated after forging to obtain additional hardness and wear resisting qualities if necessary. The entire webbed wheel rim 2 can be hardened, or a method of preferential hardening such as rim quenching after the final forging operation, or local flame or induction heating followed by quenching can be used to locally harden the wearing surfaces only of the tread 18 and the flange 19 where they bear against the rail.

The webbed wheel rim 2 has two essentially cylindrical surfaces machined inside to fit over the two corresponding cylindrical surfaces on the webbed wheel center 1. These are the large diameter inner surface 20, with machined shoulder 21, which is designed to fit over and against the web 13 of the webbed wheel center, and the smaller diameter surface 22 at the small diameter of the rim web 17, which is intended to fit over the corresponding cylindrical hub surface 15.

The large diameter inner cylindrical surface 20 of the webbed wheel rim 2 and the corresponding mating surface 14 on the circumference of the web 13 of the webbed wheel center 1 are machined to the proper respective diameters to give a relatively large diametral interference between surfaces 20 and 14, while the small diameter mating surfaces 22 and 15 are machined so that there is only a small diametral interference between them. Choosing the relative fits in this manner puts the heavy press fit, and hence the greatest frictional engagement, at the large diameter mating surfaces 20 and 14, where there are not only large areas in contact but also large annular masses of metal in the flange 19 and center web 13 to back up the fit with a minimum deflection of the hub 12 at the location of the anti-friction bearings. At the small diameter fit, where surface 22 is pressed into position on surface 15, it is desired only to guide the webbed wheel rim during assembly and back up the outer race of the anti-friction bearing directly underneath, and at the same time hold deflection of the outer race during assembly to a minimum. Hence relative diameters are chosen for surfaces 15 and 22 such that only a light press fit results at those surfaces.

For assembly of the wheel, webbed wheel center 1 and webbed wheel rim 2 are placed in the relative position shown in Figure 3 and forced together until machined shoulder 21 of the webbed wheel rim bears against annular surface 16 on the webbed wheel center. The webbed wheel rim 2 is heated if desired in order to reduce the force necessary for assembly. It may be noted that for ease in assembly it is desirable to machine surface 15 on the webbed wheel center 1 to a slightly smaller diameter over that portion 15ª over which the entire width of surface 22 must pass before reaching its final position.

It will be noted that the web 13 on the web wheel center 1 is disposed thereon so as to contact and support the webbed wheel rim 2 at the inside of the rim and in the region of the flange 19. Therefore, when moving along a curved track the end thrust of the load on the webbed wheel center 1 resisted by the flange 19 contacting with the rail R tends to tighten the wedge fit between this web 13 and the rim. End thrust on the web wheel center 1 in the opposite direction on the same wheel will not be restrained by the flange contacting with the rail and therefore at no time does the end thrust of the load tend to force the rim off from the webbed wheel center. It will be further noted that the bearings are so spaced that one of the bearings is substantially in radial alignment with the web 13 on the wheel center 1 and the other is substantially in alignment with the web 17 of the wheel rim 2. The widely spaced webs thus serve to hold the outer races of the anti-friction bearings to a true circle. When deflection of the outer races is held to a minimum in this way, the load on each bearing may be distributed over a greater number of rollers at a time, and bearing life is greatly increased.

The webbed wheel rim 2, when worn to the point of requiring replacement, is removed from the webbed wheel center 1 by the reverse of the process of assembly. A new webbed wheel rim is then fitted to the webbed wheel center. Compared with the replacement of an entire car wheel, replacement in this manner of the wearing surface alone uses less steel and involves fewer and simpler machining operations.

There are modifications of the wheel as described which maintain the same essential functions of the components. For example, it may be preferable in some cases to machine a limiting shoulder on the webbed wheel center rather than on the rim. In this particular construction, shown in Figure 4, the functions of wheel center web annular surface 16 and wheel rim shoulder 21 shown in Figure 1 are provided by a machined annular surface 23 on the rim web 17 and a shoulder 24 on the wheel center against which the rim web is pressed. One possible advantage of the construction shown in Figure 4 is that stress concentration effects at the junction of flange 19 and rim 18 may be appreciably reduced by the omission of shoulder 21, thereby reducing the possibility of flanges breaking in service.

It is obvious that other minor changes in the details of construction may also be made without departing from the spirit of the invention as set forth in the appended claims.

I claim:

1. A double webbed rail wheel comprising a hub and a rim having a rail engaging portion and a rail flange at one side of the rail engaging portion, a rim supporting web integral with the hub and disposed at the flanged side of the rim and adapted to engage said rim at the inner face thereof, a second rim supporting web formed integral with the rim and disposed at the opposite side thereof from said rail flange, said last named supporting web extending inwardly from the rim and adapted to make contact with said hub, said webs having wedge fitting engagement with the rim and hub respectively.

2. A double webbed rail wheel comprising a hub and a rim having a rail engaging portion and a rail flange at one side of the rail engaging portion, a rim supporting web integral with the hub and disposed at the flanged side of the rim and adapted to engage said rim at the inner face thereof, a second rim supporting web formed integral with the rim and disposed at the opposite thereof from said rail flange, said last named supporting web extending inwardly from the rim and adapted to make contact with said hub, said webs having wedge fitting engagement with the rim and hub respectively, said wedge fitting parts being shaped and positioned so that the lateral thrust of the load on the hub restrained by the flange on the rim holds the wedge fitting parts in assembled position.

3. A double webbed rail wheel comprising a hub and a rim having a rail engaging portion and a rail flange at one side of the rail engaging portion, a rim supporting web integral with the hub and disposed at the flanged side of the rim and adapted to engage said rim at the inner face thereof, a second rim supporting web formed integral with the rim and disposed at the opposite side thereof from said rail flange, said last named supporting web extending inwardly from the rim and adapted to make contact with said hub, said webs having wedge fitting engagement with the rim and hub respectively, said wedge fitting parts being shaped and positioned so that the lateral thrust of the load on the hub restrained by the flange on the rim holds the wedge fitting parts in assembled position, and means for limiting the extent of wedge fitting engagement.

HENRY FORT FLOWERS.

REFERENCES CITED

The following references are of record in the file of this patent:

UNITED STATES PATENTS

| Number | Name | Date |
|---|---|---|
| 302,818 | Baker | July 29, 1884 |
| 369,752 | Swartwout | Sept. 13, 1887 |
| 408,890 | Mann | Aug. 13, 1889 |
| 448,683 | Silverthorn | Mar. 24, 1891 |
| 1,254,557 | Witham | Jan. 22, 1918 |
| 1,466,468 | Charter | Aug. 28, 1923 |
| 1,856,095 | Frank | May 3, 1932 |
| 1,981,953 | Frank | Nov. 27, 1934 |

FOREIGN PATENTS

| Number | Country | Date |
|---|---|---|
| 69,750 | Germany | 1892 |